(12) United States Patent
Baumann (10) Patent No.: US 8,800,196 B2
(45) Date of Patent: Aug. 12, 2014

(54) MULTI-APPLICATION, PORTABLE FISHING ROD HOLDER

(76) Inventor: Jacob B. Baumann, Pasadena, MD (US)

( * ) Notice: Subject to any disclaimer, the term of this patent is extended or adjusted under 35 U.S.C. 154(b) by 480 days.

(21) Appl. No.: 13/082,845

(22) Filed: Apr. 8, 2011

(65) Prior Publication Data

US 2012/0144724 A1    Jun. 14, 2012

Related U.S. Application Data

(60) Provisional application No. 61/459,382, filed on Dec. 13, 2010.

(51) Int. Cl.
*A01K 97/10* (2006.01)

(52) U.S. Cl.
USPC ............ 43/21.2; 248/534; 248/535; 248/536

(58) Field of Classification Search
USPC ............ 43/21.2; 248/511, 534–536, 538–541
See application file for complete search history.

(56) References Cited

U.S. PATENT DOCUMENTS

| | | | | | |
|---|---|---|---|---|---|
| 417,997 | A | * | 12/1889 | Dupuis | 248/535 |
| 1,520,543 | A | * | 12/1924 | Meachen | 43/21.2 |
| 1,577,612 | A | * | 3/1926 | Dees | 43/21.2 |
| 1,987,842 | A | * | 1/1935 | Sampson | 43/21.2 |
| 2,003,535 | A | * | 6/1935 | Haskin | 248/535 |
| 2,178,655 | A | * | 11/1939 | Strandt | 43/21.2 |
| 2,314,747 | A | * | 3/1943 | White | 43/21.2 |
| 2,541,146 | A | * | 2/1951 | Bahr | 248/538 |
| 2,548,328 | A | * | 4/1951 | Thayer | 43/21.2 |
| 2,619,308 | A | * | 11/1952 | Guestinger | 248/538 |
| 2,632,616 | A | * | 3/1953 | Heistand | 248/540 |
| 2,642,690 | A | * | 6/1953 | Soenksen | 43/21.2 |
| 2,694,538 | A | * | 11/1954 | Consolo et al. | 248/535 |
| 2,961,209 | A | * | 11/1960 | Willey | 248/540 |
| 2,985,414 | A | * | 5/1961 | Ince | 248/534 |
| 2,988,311 | A | * | 6/1961 | Bow | 248/514 |
| 3,033,502 | A | * | 5/1962 | Silver | 248/538 |
| 3,290,816 | A | * | 12/1966 | Eklof | 43/21.2 |
| 3,385,544 | A | * | 5/1968 | Barnett | 43/21.2 |
| 3,484,066 | A | * | 12/1969 | Aunspaugh | 43/21.2 |
| 3,568,963 | A | * | 3/1971 | Koskinen | 248/539 |
| 3,612,454 | A | * | 10/1971 | Linn | 43/21.2 |
| 3,708,141 | A | * | 1/1973 | Friedgen et al. | 248/540 |
| 3,783,547 | A | * | 1/1974 | Bystrom et al. | 43/21.2 |
| 3,903,633 | A | * | 9/1975 | Hutcherson | 43/21.2 |
| 3,903,634 | A | * | 9/1975 | Miyamae | 43/21.2 |

(Continued)

FOREIGN PATENT DOCUMENTS

| | | | | | |
|---|---|---|---|---|---|
| JP | 2008005825 | A | * | 1/2008 | ............ A01K 97/10 |
| JP | 2008017792 | A | * | 1/2008 | ............ A01K 97/10 |
| JP | 2011092127 | A | * | 5/2011 | ............ A01K 97/10 |

*Primary Examiner* — Darren W Ark
(74) *Attorney, Agent, or Firm* — Larry J. Guffey (57) ABSTRACT

An improved portable, fishing rod holder, for holding the handle of a fishing rod while it is in use and that is capable of being detachably secured to an assortment of environmental support structures, includes: (a) a container whose first end has an opening that is adapted to removably receive a fishing rod handle and whose second end has a threaded hole, (b) a threaded rod having proximal and distal ends, and a thread configuration adapted to allow this rod's proximal end to be detachably threaded into the threaded hole of the container's second end, and (c) a plurality of two-part (i.e., active and passive) clamps, each of which is capable of detachably securing this container to one of an assortment of possibly available environmental support structures.

5 Claims, 5 Drawing Sheets

(56) References Cited

U.S. PATENT DOCUMENTS

| | | | | |
|---|---|---|---|---|
| 4,124,190 A * | 11/1978 | Wheeler | | 248/538 |
| 4,235,409 A * | 11/1980 | Cummings | | 248/538 |
| 4,407,089 A * | 10/1983 | Miller | | 43/21.2 |
| 4,486,968 A * | 12/1984 | Gould | | 43/21.2 |
| 4,531,643 A * | 7/1985 | Bradley | | 248/538 |
| 4,637,156 A * | 1/1987 | Simmons | | 43/21.2 |
| 4,658,534 A * | 4/1987 | McLean | | 43/21.2 |
| 4,803,794 A * | 2/1989 | Lopez | | 43/21.2 |
| 4,852,291 A * | 8/1989 | Mengo | | 43/21.2 |
| 5,115,598 A * | 5/1992 | Shaw | | 43/21.2 |
| 5,120,016 A * | 6/1992 | Dysarz | | 43/21.2 |
| 5,142,809 A * | 9/1992 | O'Brien et al. | | 43/21.2 |
| 5,163,652 A * | 11/1992 | King | | 43/21.2 |
| 5,210,971 A * | 5/1993 | Efantis | | 43/21.2 |
| 5,247,759 A * | 9/1993 | Noriega | | 43/21.2 |
| 5,295,321 A * | 3/1994 | Matura | | 43/21.2 |
| 5,560,137 A * | 10/1996 | Herring | | 43/21.2 |
| 5,566,495 A * | 10/1996 | Kim et al. | | 43/21.2 |
| 5,625,974 A * | 5/1997 | Demaio | | 43/21.2 |
| 5,632,112 A * | 5/1997 | Steinborn | | 43/21.2 |
| 5,662,306 A * | 9/1997 | Dysarz | | 43/21.2 |
| 5,813,163 A * | 9/1998 | Dysarz | | 43/21.2 |
| 6,088,946 A * | 7/2000 | Simmons | | 43/21.2 |
| 6,216,998 B1 * | 4/2001 | Butrymowicz et al. | | 43/21.2 |
| 6,276,651 B1 * | 8/2001 | Dolan | | 248/538 |
| 6,318,017 B1 * | 11/2001 | Genardo | | 43/21.2 |
| 6,497,067 B1 * | 12/2002 | King | | 43/21.2 |
| 6,898,893 B1 * | 5/2005 | Mukdaprakorn | | 43/21.2 |
| 7,100,808 B2 * | 9/2006 | Hancock et al. | | 224/547 |
| 7,232,099 B1 * | 6/2007 | Wilcox | | 43/21.2 |
| 7,254,915 B2 * | 8/2007 | Mrotek | | 43/21.2 |
| 7,296,377 B2 * | 11/2007 | Wilcox et al. | | 43/21.2 |
| 7,434,775 B2 * | 10/2008 | Wilcox | | 43/21.2 |
| D598,689 S * | 8/2009 | McDonald | | D6/552 |
| 7,594,478 B2 * | 9/2009 | Karnes et al. | | 248/534 |
| 7,841,125 B2 | 11/2010 | Foss | | |
| 7,908,786 B2 * | 3/2011 | Bailey | | 43/21.2 |
| 8,033,046 B2 * | 10/2011 | Morehead | | 43/21.2 |
| 8,327,575 B1 * | 12/2012 | Zalewski | | 43/21.2 |
| 8,453,373 B2 * | 6/2013 | Gordon | | 43/21.2 |
| 2010/0269399 A1 * | 10/2010 | Gordon | | 43/21.2 |

* cited by examiner

MULTI-APPLICATION, PORTABLE FISHING ROD HOLDER

CROSS-REFERENCE TO RELATED APPLICATION

This application claims the benefit of Provisional Patent Application No. 61/459,382, filed Dec. 13, 2010 by Jacob B. Baumann. The teachings of this application are incorporated herein by reference to the extent that they do not conflict with the teaching herein.

BACKGROUND OF THE INVENTION

1. Field of the Invention

The present invention relates generally to fishing rods. More particularly, the present invention relates to a fits-in-bottom-of-tackle-box, portable, fishing rod holder that is configured so that it is adaptable for use with available environmental support structures.

2. Description of the Related Art

Fishing rod holders are well known. See, for example, U.S. Pat. Nos. 4,637,156, 5,560,137, 6,898,893, 7,254,915 and 7,841,125.

These inventions usually are targeted to specific environmental support structure. Thus, they usually have no significant adaptability to varying environmental support structures.

In reality, the available support structures often vary for many, if not most, users. A fishing rod holder receiving cavity or affixing device is often unavailable. Even when they might be available, users usually lack the knowledge and tools needed to attach a fishing rod holder to such devices.

An improved, adaptable fishing rod holder is therefore needed; one that provides for easy attaching and detaching of the holder to whatever environmental support structure is available. In addition, any adjustments needed to affix the holder to different environmental support structures must be able to be made quickly and easily. Finally, it would be especially desirable that if this desired, improved fishing rod holder were configured such that it could fit within the bottom of the fisherman's tackle box.

SUMMARY OF THE INVENTION

Recognizing the need for the development of an improved fishing rod holder that is adaptable for use with a wide variety of environmental support structures, the present invention is generally directed to satisfying the needs set forth above and overcoming the problems and disadvantages exhibited by prior fishing rod holders.

In accordance with a preferred embodiment of the present invention, an improved portable, fishing rod holder, for holding the handle of a fishing rod while it is in use and that is capable of being detachably secured to an assortment of environmental support structures, includes: (a) a container having first and second ends, with this first end having an opening to a cavity whose boundary configuration is adapted to removably receive into the cavity the handle of a fishing rod, and with this second end having a threaded hole, (a) a threaded rod having proximal and distal ends, and a thread configuration adapted to allow this rod's proximal end to be detachably threaded into the threaded hole of the container's second end, and (c) a plurality of clamping means for detachably securing this container to one from this assortment of environmental support structures.

Furthermore, each of these clamping means includes an active and a passive part. Each of these passive parts has a bottom surface that is configured to allow it to be placed in direct contact with one of the upper surfaces found among the above referenced assortment of environmental support structures. This bottom surface is also provided with a hole whose configuration is adapted to allow the threaded rod's distal end to pass through the hole in the passive part's bottom surface.

Meanwhile, each of these active parts has a top surface adapted to allow this top surface to be placed in direct contact with one of the lower surfaces in the assortment of environmental support structures. The active part top surface has a threaded hole with a configuration adapted to allow the threaded rod's distal end to be detachably threaded into the threaded hole in the active part's top surface.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 1:
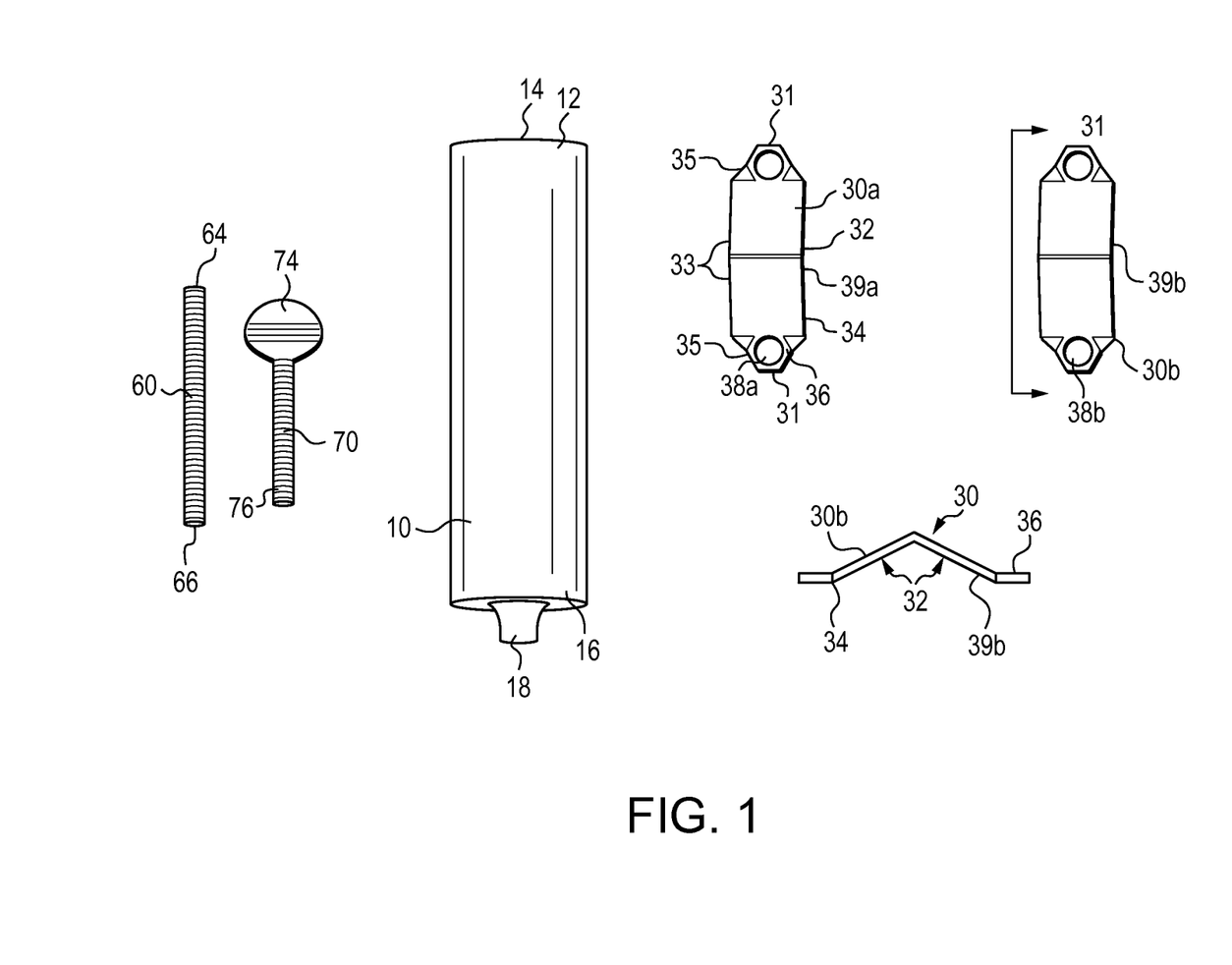
FIG. 1 is a perspective view of a variant of the present invention showing its container, threaded rods and large rectangular tubular (RT) clamp.
Figure 2:
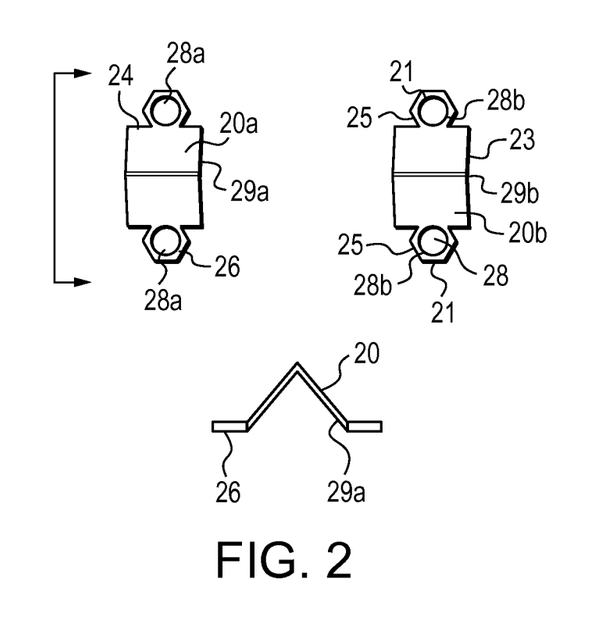
FIG. 2 shows top views of the active and passive parts of a rectangular tubular (RT) clamp and the side view of its passive part.
Figure 3:
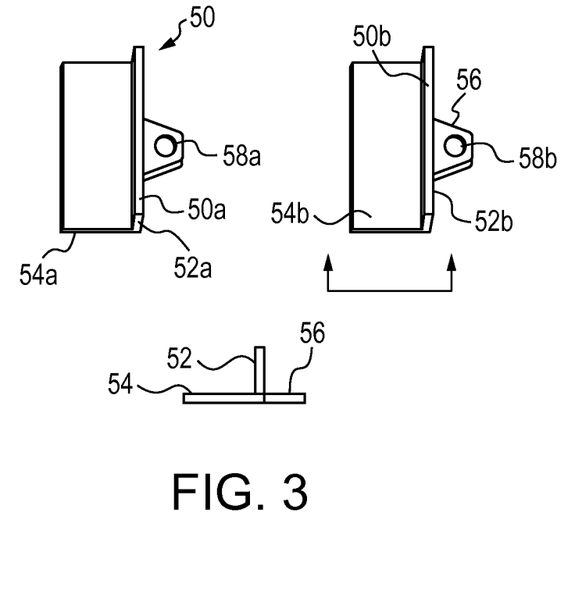
FIG. 3 shows top views of the active and passive parts of an end-of-board (EOB) clamp and the side view of its passive part.
Figure 4:
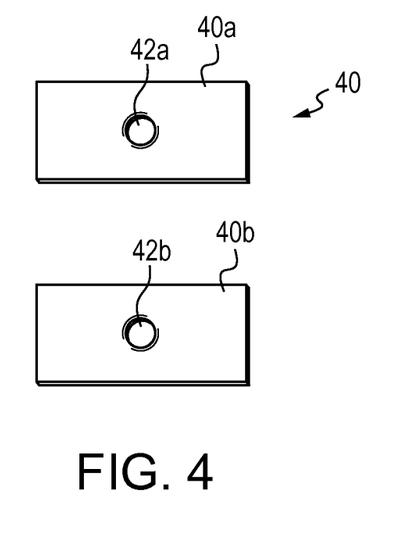
FIG. 4 shows top views of the active and passive parts of an in-the-slot (ITS) clamp.
Figure 5:
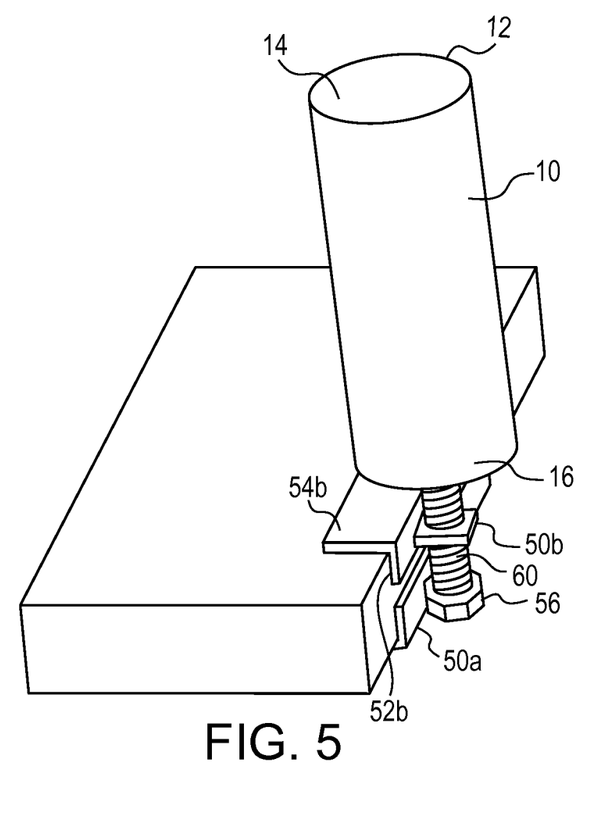
FIG. 5 is a perspective view of the present invention showing it being mounted using its EOB clamp.
Figure 6:
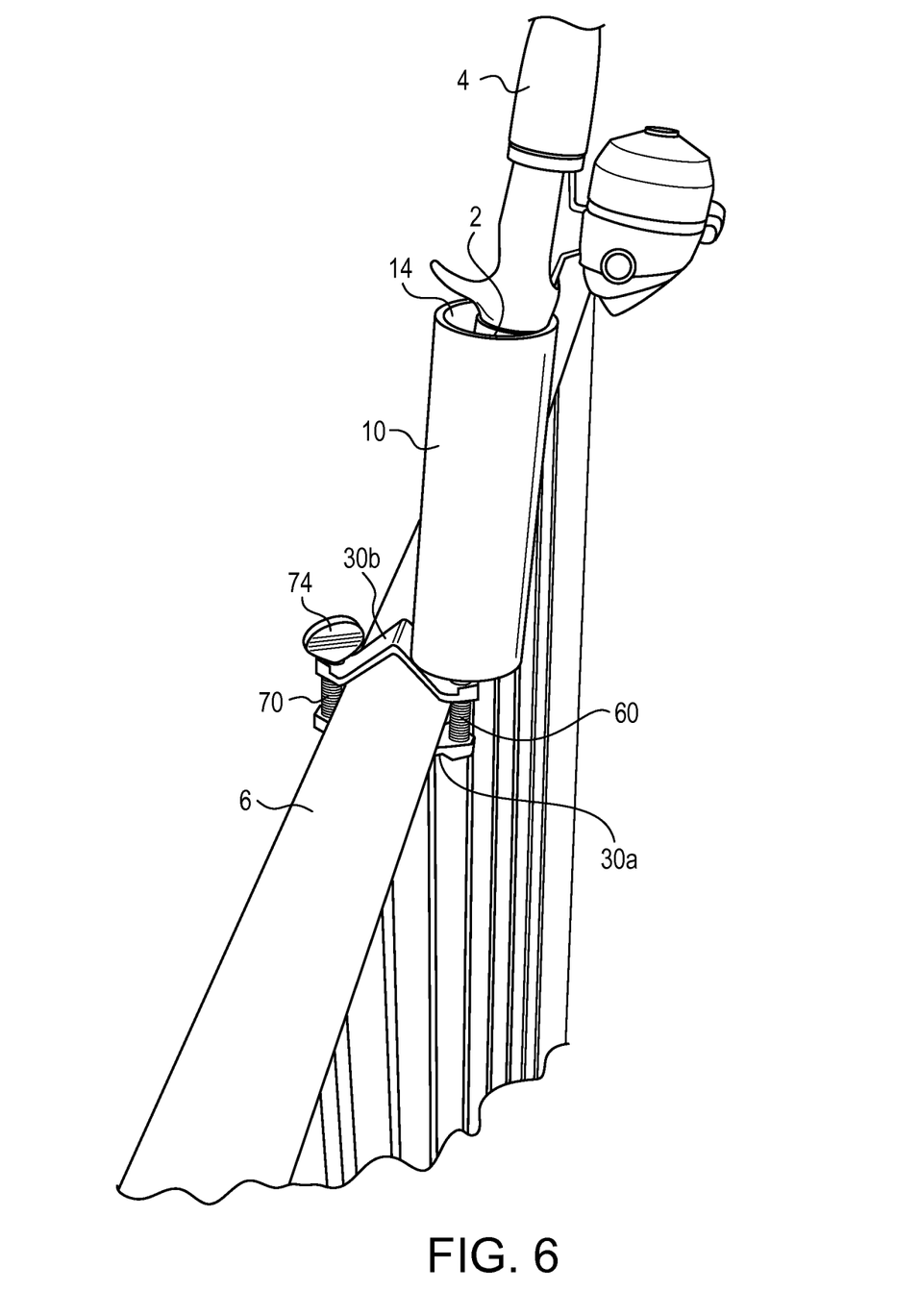
FIG. 6 is a perspective view of the present invention showing it being mounted using its rectangular tubular (RT) clamp.
Figure 7:
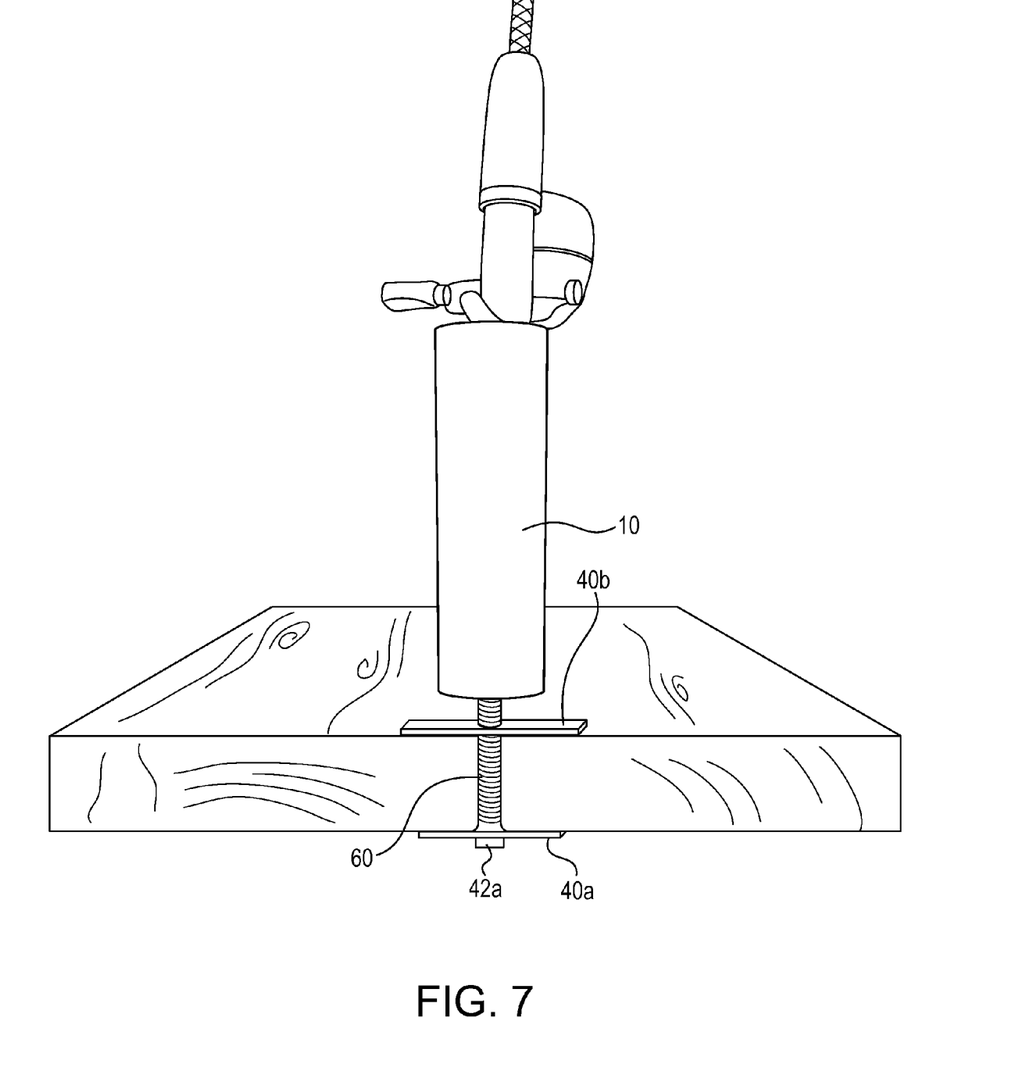
FIG. 7 is a perspective view of the present invention showing it being mounted using its in-the-slot (ITS) clamp.

Referring to FIGS. 1-7, there is illustrated a fits-in-bottom-of-tackle-box, portable, easily assembled and disassembled fishing rod holder that includes various, interchangeable attachment means or two-part clamps or clamping means which are configured so as to allow the holder's container 10 to be used with a wide range of available environmental support structures which can generally be described as being of the type that have an upper and a lower surface to which various parts of this clamp will be detachably affixed.

These two-part clamps or clamping means are named herein for the environmental support structures to which they are primarily to attach and include: the third clamping means or rectangular tubular (RT) clamp 20, the larger tubular clamp 30, the second clamping means or the in-the-slot (ITS) clamp 40 and the first clamping means or end-of-board (EOB)

clamp 50. While these clamps have been specifically mentioned, it should be recognized that there are many other specialized clamps that could be listed which are configured to attach to the multitude of possible boundary shapes which may be found on environmental support structures, e.g., an environmental support structure's boundary shape could be described as being polygonal in nature (e.g., for rectangular, square, triangular or five or more sided tubing) would yield a fourth clamping means or polygonal tubular clamp or an environmental support structure's boundary shape could be described as being circular or round nature so as to yield a fifth clamping means or round tubular clamp.

A specified length, first threaded rod 60 and/or a second hand-turnable, threaded bolt 70, having a proximal end 74 that has been flattened to provide a wider area surface that one can use a hand to grasp and turn the bolt, are used to join the rod's proximal end 64 to the holder's container and the rod's or bolt's distal end 66, 76 to the clamps.

The holder's container 10 is a circular tube having a first end 12 which has an opening that provides access to a cavity or well 14 that is sized and configured (or has a configuration adapted . . . ) to removably accept the round butt or handle or grip end 2 of a fishing rod 4. The second end 16 of this tube is closed and contains on its centerline a threaded hole or cavity 18 into which the threaded rod or bolt's proximal end is screwed in order to utilize the specific clamp that is needed to attach this holder's container to the available support structure 6. Once the threaded rod reaches the maximum depth to which it can be screwed into this cavity 18, the container itself can then be used to turn the threaded rod in the opposite direction so that the rod's distal end can be screwed into a nut or threaded hole located beneath this free or distal end.

When the available support structure is a circular pipe, the holder's two-part round 20 or rectangular 30 tube clamps may be used. The rectangular tube clamp 30 includes two, relatively identically shaped, narrow width, pieces which we identify herein as being the active 30a and passive 30b parts. These are bent so that they have at their midpoints an included angle 32 between them. They have at each of the ends 34 of their mid-portion sections a flat, plate-like extension 36 that is attached to the angle such that these extensions align with one another and effectively lie in the same plane. Each of these extensions has a hole 38 in it. Alternatively, we can refer to these holes as being a first and a second hole that are in a spaced-apart relationship. Similarly, we can also refer to either this rectangular tubular clamp's active or passive parts as being a member having two ends 31 and a surface which has two center 33 and two end 35 portions, with the two center portions being joined together so as to have an included angle, and with each of the two end portions being joined to its adjacent center portion so as to have this same included angle. Each of these end portions 35 is then seen to a hole therein (threaded for the active part and unthreaded for the passive part).

On one of these pieces the holes are not threaded and we refer to the piece or part having such unthreaded or passive holes 38b as being the passive part 30b of this clamp. This passive part 30b will also typically have a mid-portion section whose bottom surface 39b is configured to directly attach to the upper surface of an environmental support structure. The other piece has threaded or active holes 38a in each of its extensions and we refer to this piece or part as the active part 30a of this clamp. Similarly, it will have a mid-portion section whose top surface 39a is configured to directly attach to the lower surface of an environmental support structure. See FIGS. 1, 2 and 6.

The rod holder's container is attached to a circular pipe by first screwing one end of the threaded rod into the threaded hole in the container's closed end. The part of the angle whose extension holes are not threaded is aligned such that one of these holes can allow the free end of the rod that extends from the bottom of the container to pass through it. The middle of this piece of angle is then placed enclosed-angle down over the upper surface of the pipe onto which this holder is to be mounted. The middle of second of these angle parts (i.e., the ones whose extension holes are threaded—the active part) is brought enclosed-angle-upward into contact with the underside or lower surface of the pipe and the threaded hole in one of its extensions is aligned with the free end of the threaded rod and pressed into contact with it such that the threaded rod can be made to rotate so that it threads itself into this extension's threaded hole. The extensions of these angled parts that are on the opposite side of the pipe are positioned so that their holes are aligned and the free end of the hand-turnable bolt 70 is made to pass through the upper angle's unthreaded hole and then to thread into the lower angle's threaded hole. This threading action serves to bring the upper and lower angle's extensions closer together so as to make these middle portions of these angles come together so as to clamp around and affix the holder to the circular pipe.

The holder's two-part, round 20 tube clamp is very similar to the holder's two-part, rectangular tube clamp. Each identically-shaped active 20a and passive 20b part of this clamp has at each of the ends 24 of its midportion section a flat, plate-like extension 26 that is attached such that these extensions align with one another and effectively lie in the same plane. Each of these extensions has a hole 28 in it. On one of these clamps these holes 28b are not threaded, but on the other they are threaded 28a. However, this clamp's middle portion is not a narrow width piece of angle but is instead a round tubular portion of a specified diameter or radius. As before, the active part of this clamp will have a mid-portion section whose top surface 29a is configured to directly attach to the lower surface of an environmental support structure, while the passive part of this clamp will have a mid-portion section whose bottom surface 29b is configured to directly attach to the upper surface of an environmental support structure. Alternatively, we can refer to either this round tubular clamp's active or passive parts as being a member having two ends 21 and a surface which has a center 23 and two end 25 portions, with this center portion having a specified radius of curvature, and with each of the two end portions being joined to each side of the center portion at a prescribed included angle. Each of these end portions 25 is then seen to a hole therein (threaded for the active part and unthreaded for the passive part).

The holder's two-part, in-the-slot clamp 40 includes similarly shaped flat active 40a and passive 40b pieces, each of which has a hole 42a, 42b at its center and with one of these holes being threaded 42a while the other is not threaded.

Assuming that the depth of the slot in which this clamp is to be used is less than the length of the holder's threaded rod and that this slot has a free end from which the slot can be accessed, one end of the threaded rod 60 is screwed fully into the hole 18 in the bottom of the container 10, the piece 40b with the non-threaded hole pushed up over the free end of the threaded rod and onto the threaded rod until it comes to rest against the bottom of the container. The piece 40a with the threaded hole is then threaded onto the rod's end. Keeping these pieces 40a, 40b separated by a distance greater than the depth of the slot, the holder's threaded rod is slipped into the slot. The container is then raised upward so as to bring the top of the bottom piece 40a into contact with the bottom of the board, etc. in which the slot is located. Keeping such a pressure on the bottom of the board so as to cause enough friction between the board and the piece 40*a* so that it will not rotate if the threaded rod rotates within the piece 40*a*, the container is rotated clockwise to as to cause the threaded rod to be pulled into this lower piece 40*a*. Continued turning of the container eventually closes the gap between the pieces 40*a*, 40*b* such they come together to clamp on the board that separates them and locks the holder 1 onto the board. See FIGS. 4 and 7.

The holder's two-part (active 50*a* and passive 50*b*) end-of-board clamp 50 has two 90 degree angle pieces, with each of these having on one of its legs 52*a*, 54*a* or 52*b*, 54*b* an extension 56 in which a hole 58 is present. On one of these pieces the hole is not threaded 58*b*, but on the other piece the hole is threaded 58*a*.

The technique for using the end-of-board clamp 50 is similar to that of the round 20 and rectangular 30 tube clamps, except that there is only one side of this clamp that needs to be locked together. The threaded rod 60 is screwed into the threaded hole in the container's closed end. The top part 50*b* of the 90 degree angle whose extension hole is not threaded is placed on top of the board on whose end the holder is to be mounted and oriented such that its extension and its unthreaded hole is located off the free end of the board. The bottom part 50*a* of the 90 degree angle whose extension hole is threaded is placed underneath the bottom side of the board and aligned with the part 50*b* that's located on the top side of the board. The free end of the threaded rod that extends from the bottom of the container is then passed thought the top part's 50*b* unthreaded hole and extended further down until it comes into contact with the threaded hole 58*a* of the bottom part 50*a*. Clockwise rotation of the holder's container 10 causes the threaded rod to be pulled into this bottom part 50*a*. Continued turning of the container eventually closes the gap between the pieces 50*a*, 50*b* such they come together to clamp on the end of the board that separates them and locks the holder 1 onto the end of the board.

The foregoing is considered as illustrative only of the principles of the invention. For example, the present invention could just as well been described above as a method for holding a fishing rod's handle while it is in use and detachably affixing it to a wide range of available environmental support structures.

Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereinafter set forth in the claims to the invention.

I claim:

1. A portable, fishing rod holder for holding a handle of a fishing rod while said rod is in use, said holder capable of being detachably secured to an assortment of environmental support structures, each of said environmental support structures of a type having an upper and a lower surface, said holder comprising:

a container having first and second ends and an axial centerline between said ends, said first end having an opening to a cavity having a configuration adapted to removably receive into said cavity said handle of said fishing rod, said second end having an axially-aligned threaded hole, a first threaded rod having proximal and distal ends, and a threaded configuration adapted to allow said first rod proximal end to be detachably threaded into said threaded hole of said container second end, a plurality of clamping means for detachably securing said container to one of said assortment of environmental support structures, wherein each of said clamping means having an active and a passive part, said passive part having a bottom surface adapted to allow said bottom surface to be placed in direct contact with one of said upper surfaces in said assortment of environmental support structures, said passive part bottom surface having a first passive hole with a configuration adapted to allow said first threaded rod distal end to pass through said passive hole in said passive part bottom surface, said active part having a top surface adapted to allow said top surface to be placed in direct contact with one of said lower surfaces in said assortment of environmental support structures, said active part top surface having a first threaded hole with a configuration adapted to allow said first threaded rod distal end to be detachably threaded into said active part top surface first threaded hole, wherein, when one of said plurality of clamping means is detachably securing said container to one of said assortment of environmental support structures, said first threaded rod proximal end is detachably threaded into said axially-aligned, threaded hole of said container second end and said first threaded rod distal end passes through said first passive hole in said passive part and is threaded into said first threaded hole of said active part, a second threaded rod having proximal and distal ends, in at least one of said clamping means, a second passive hole in said passive part and a second threaded hole in said active part, wherein said first passive hole, first threaded hole, second passive hole, and said second threaded hole being in a spaced-apart relationship, wherein said second passive hole of said passive part having a configuration adapted to allow said second threaded rod distal end to passively pass through said second passive hole in said passive part, wherein said second threaded hole of said active part having a configuration adapted to allow said second threaded rod distal end to be detachably threaded into said second threaded hole of said active part, and wherein, when one of said plurality of clamping means having said second passive hole and second threaded hole is detachably securing said container to one of said assortment of environmental support structures, said second threaded rod proximal end passes through said second passive hole in said passive part and is threaded into said second threaded hole of said active part.

2. The portable, fishing rod holder as recited in claim 1, wherein:

said plurality of clamping means comprising the group consisting of a first clamping means having a configuration adapted to allow said first clamping means of said plurality of clamping means to be attached to a first environmental support structure of said assortment of environmental support structures consisting of a board having an end surface, and a second clamping means of said plurality of clamping means having a configuration adapted to allow said second clamping means to be attached to a second environmental support structure of said assortment of environmental support structures consisting of a board having the upper surface, the lower surface, and an end surface and a slot that extends between said upper and lower surfaces and is accessible from said end surface.

3. The portable, fishing rod holder as recited in claim 1, wherein:

said plurality of clamping means includes a clamping means having a configuration adapted to allow said clamping means to be attached to an environmental support structure of said assortment of environmental support structures that includes a rectangular or polygonal tubular member.

4. A portable, fishing rod holder for holding a handle of a fishing rod while said rod is in use, said holder capable of being detachably secured to an assortment of environmental support structures, each of said environmental support structures of a type having an upper and a lower surface, said holder comprising:

a container having first and second ends and an axial centerline between said ends, said first end having an opening to a cavity having a configuration adapted to removably receive into said cavity said handle of said fishing rod, said second end having an axially-aligned threaded hole, a first threaded rod having proximal and distal ends, and a threaded configuration adapted to allow said first threaded rod proximal end to be detachably threaded into said threaded hole of said container second end, an in-the-slot clamp having an in-the-slot active and an in-the-slot passive part, said in-the-slot passive part having a flat bottom surface having an unthreaded, passive hole therein which has a configuration adapted to allow said first threaded rod distal end to pass through said unthreaded hole, said in-the-slot active part having a flat top surface having a threaded hole therein which has a configuration adapted to allow said first threaded rod distal end to be detachably threaded into said threaded hole, wherein, when said in-the-slot clamp is detachably securing said container to one of said assortment of environmental support structures, said first threaded rod proximal end is detachably threaded into said axially-aligned, threaded hole of said container second end and said first threaded rod distal end passes through said passive hole in said in-the-slot passive part and is threaded into said threaded hole of said in-the-slot active part, an end-of-board clamp having an end-of-board active and an end-of-board passive part, said end-of-board passive part having a passive part first leg and a passive part second leg that are joined together at a first straight line joint that includes at said first joint a ninety degree included angle between said passive part legs, said passive part first leg having a passive part extension that includes an unthreaded, passive hole therein which has a configuration adapted to allow said first threaded rod distal end to pass through said unthreaded hole, said active part having an active part first leg and an active part second leg that are joined together at a second straight line joint that includes at said second joint a ninety degree included angle between said active part legs, said active part first leg having an active part extension that includes a threaded hole therein which has a configuration adapted to allow said first threaded rod distal end to be detachably threaded into said threaded hole, and wherein, when said end-of-board clamp is detachably securing said container to one of said assortment of environmental support structures, said first threaded rod proximal end is detachably threaded into said axially-aligned, threaded hole of said container second end and said first threaded rod distal end passes through said passive hole in said passive part extension and is threaded into said threaded hole of said active part extension.

5. The portable, fishing rod holder as recited in claim 4, further comprising:

a second threaded rod having proximal and distal ends, a rectangular tubular clamp having a rectangular tubular active and a rectangular tubular passive part, said rectangular tubular passive part having a bottom surface which has two bottom surface center and two bottom surface end portions, said two bottom surface center portions being joined together so as to have a downward directed, included angle, and each of said two bottom surface end portions being joined to its adjacent bottom surface center portion so as to have an upward directed, included angle, and each of said bottom surface end portions having an unthreaded, passive hole therein which has a configuration adapted to allow one of said distal ends of said first and second threaded rods to pass through said bottom surface unthreaded hole, said active part having a top surface which as two top surface center and two top surface end portions, said two top surface center portions being joined together so as to have an upward directed, included angle, and each of said two top surface end portions being joined to its adjacent top surface center portion so as to have a downward directed, including angle, and each of said top surface end portions having a top surface threaded hole therein which has a configuration adapted to allow one of said distal ends of said first and second threaded rods to be detachably threaded into said top surface threaded hole, and wherein, when said rectangular tubular clamp is detachably securing said container to one of said assortment of environmental support structures, said first threaded rod proximal end is detachably threaded into said axially-aligned, threaded hole of said container second end and said first threaded rod distal end passes through one of said passive holes in said bottom surface end portions and is threaded into one of said threaded holes of said top surface end portions, and said second threaded rod distal end passes through the other of said passive holes in said bottom surface end portions and is threaded into the other of said threaded holes of said top surface end portions.

* * * * *